Figure 1:
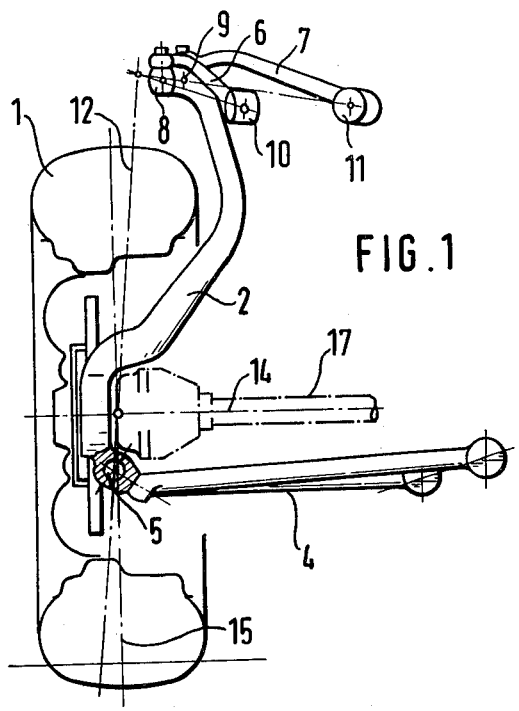

United States Patent [19]

Müller

[11] 4,440,420
[45] Apr. 3, 1984

[54] INDEPENDENT SUSPENSION OF A STEERABLE WHEEL TO MOTOR VEHICLES

[75] Inventor: Rudolf Müller, Dachau, Fed. Rep. of Germany

[73] Assignee: Bayerische Motoren Werke Aktiengesellschaft, Munich, Fed. Rep. of Germany

[21] Appl. No.: 426,930

[22] Filed: Sep. 29, 1982

[30] Foreign Application Priority Data

Sep. 30, 1981 [DE] Fed. Rep. of Germany ....... 3138850

[51] Int. Cl.³ .............................................. B60G 3/20
[52] U.S. Cl. .................................... 280/691; 280/660; 280/661; 280/675
[58] Field of Search ...................... 280/96.3, 660, 661, 280/673, 675, 690, 691, 692, 693, 694, 695, 696

[56] References Cited

U.S. PATENT DOCUMENTS 2,177,934 10/1939 Britton et al. ....................... 280/694

3,881,741  5/1975  Müller ................................ 280/696

FOREIGN PATENT DOCUMENTS 1938850  5/1970  Fed. Rep. of Germany ...... 280/660
1938851  8/1970  Fed. Rep. of Germany ...... 280/660

Primary Examiner—Joseph F. Peters, Jr.
Assistant Examiner—Kenneth R. Rice
Attorney, Agent, or Firm—Craig & Burns

[57] ABSTRACT

An independent suspension for steered wheels of motor vehicles in which the wheel carrier that serves for the guidance of the wheel during spring and steering movements is connected with the vehicle superstructure in its lower area by means of a cross guide member and in its upper area by way of two individual guide members for achieving an ideal steering axis; the symmetry line with respect to the two upper guide members thereby subtends in the straight driving position of the wheel—as viewed in plan view—an acute angle to the wheel axis and is located to the rear of the wheel axis as viewed in the driving direction.

3 Claims, 2 Drawing Figures

INDEPENDENT SUSPENSION OF A STEERABLE WHEEL TO MOTOR VEHICLES

The present invention relates to an independent suspension of a steered wheel of motor vehicles of the type in which a wheel carrier is connected with the vehicle superstructure by way of a cross-guide member in its lower area and by way of two individual guide members in its upper area for purposes of guiding the wheel during spring and steering movements, whereby the wheel is pivotal about an ideal instantaneous pivot axis resulting from the line of intersection of the two planes that are defined, respectively, by the lower point of pivotal connection at the wheel carrier and the two axes of the upper guide members.

Such a wheel suspension is known in the prior art (German Pat. No. 1,938,850, FIG. 7).

In connection with front axles for motor vehicles and front wheel drive, one aims at keeping as small as possible the interference force lever arm. On the other hand, if possible, a negative camber should result on the curve outside and a positive camber on the curve inside when the wheel is turned. The latter can be achieved in vehicles with a rear-wheel drive by a correspondingly large positive caster angle; however, in connection with vehicles having front wheel drives, one cannot come back to such a solution without further measures because otherwise, undesired reaction moments on the steering system result with deflected drive joints.

The type of construction of a nondriven front axle, known from the German Pat. No. 1,938,850, FIG. 7, has a stronger negative kingpin angle which leads to the fact that during the turning of the wheels a negative camber is present at both wheels.

The present invention is concerned with the task to provide an independent suspension of a steered wheel of a motor vehicle of the aforementioned type of construction, by means of which the interference force lever arm and the positive caster angle can be kept near zero—in the straight driving position of the wheels—, whereby additionally with turned wheels, the desired negative camber change takes place essentially only for the wheel on the outside of the curve.

The underlying problems are solved according to the present invention in connection with a wheel suspension of the aforementioned type in that—as viewed in plan view—the symmetry line with respect to the two upper guide members subtends an acute angle to the wheel axis in the straight position of the wheel and is located to the rear of the wheel axis as viewed in the driving direction.

Owing to these measures, the ideal pivot axis travels rearwardly in its upper area during the turning of the wheel on the outside of the curve, which already by itself effects a negative camber change. Since the two upper guide members are oriented toward the rear, a further negative camber change will result from the spring movement by the spring deflection of the wheel on the outside of the curve as a consequence of the fact that the upper guide members altogether are shorter—as is customary in connection with double-cross guide members. Both of these features considerably increase the maximum transmittable lateral forces during curve drives. As a result of the already described change in inclination of the ideal steering axis, also the positive caster distance increases at the wheel on the outside of the curve, initially conceived only small in the straight driving position of the wheels, which is important for a good steering return of the steerable wheels.

In a preferred embodiment of the present invention, the symmetry line corresponding to the straight driving position of the wheel, with respect to the two upper guide members is approximately perpendicular in plan view to the wheel center plane of the wheel turned maximally toward the outside of the curve whereas the symmetry line extends approximately parallelly to the wheel center plane of the wheel turned maximally toward the inside of the curve. In this manner, the already mentioned negative camber change is particularly large with the wheel on the outside of the curve and is particularly small with the wheel on the inside of the curve, whereby even a desired positive camber change takes place for the wheel on the inside of the curve as a result of the travel path of the point of pivotal connection of the lower guide member.

Figure 2:
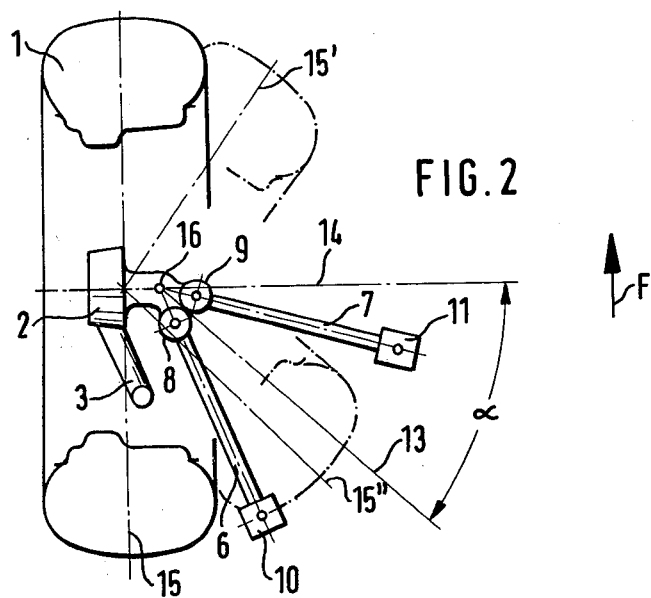

These and other objects, features and advantages of the present invention will become more apparent from the following description when taken in connection with the accompanying drawing which shows, for purposes of illustration only, one embodiment in accordance with the present invention, and wherein:

FIG. 1 is a rear elevational view of a wheel suspension in accordance with the present invention; and FIG. 2 is a top plan view on the wheel suspension in accordance with the present invention.

Referring now to the drawing wherein like reference numerals are used throughout the two views to designate like parts, the steerable and driven wheel of a passenger motor vehicle is designated in the drawing by reference numeral 1 which is supported on a wheel carrier 2 having a steering lever 3. For purposes of guiding the wheel 1 and therewith also the wheel carrier 2 during the spring and steering movements, a lower cross guide member 4, for example, of wishbone-type construction is provided which is connected with the wheel carrier 2 in the lower area thereof by way of a joint 5 whereas two individual guide arms 6 and 7 engage at the wheel carrier 2 in the upper area thereof by way of joints 8 and 9. The cross guide member 4 and the guide members 6 and 7 are pivotally connected at their ends opposite the wheel carrier 2 to the vehicle superstructure, which may be formed, for example, by the body, chassis or chassis frame of the vehicle.

In particular, the joints 10 and 11 on the side of the vehicle superstructure do not carry out only pure rotary movements, but to a limited extent also cardanic movements.

The wheel 1 rotates during the steering movement about the instantaneous ideal pivot axis 12 which results from the line of intersection of the two planes that are defined respectively by the pivot point of the joint 5 and the axes of the guide members 6 and 7.

As one can recognize in particular from FIG. 2, the symmetry line 13 with respect to the two upper guide members 6 and 7 is located—in plan view—in the straight driving position of the wheel 1 (illustrated in full line) to the rear of the wheel axis 14 as viewed in the driving direction F and subtends an acute angle α with respect to the wheel axis 14.

In the embodiment illustrated in the drawing, the two upper guide members 6 and 7 are located to the rear of the wheel axis 14.

In FIG. 2, the wheel center plane 15 with maximum turning of the wheel on the outside of the curve is designated by reference numeral 15' and with a maximum turning of the wheel on the inside of the curve by reference numeral 15".

In a particularly preferred embodiment of the present invention, the symmetry line 13 with respect to the two upper guide members 6 and 7 corresponding to the straight driving position of the wheel 1 is—as viewed in plan view—approximately perpendicular to the wheel center plane 15' of the wheel 1 turned maximum toward the outside of the curve whereas it extends approximately parallelly to the wheel center plane 15" of the wheel 1 turned maximum toward the inside of the curve.

It can be seen therefrom that the two upper guide members 6 and 7 which are oriented toward the rear in the manner described hereinabove, displace the ideal pivot axis 12, respectively, the wheel carrier 2 in its upper area also toward the rear during spring deflections, in particular for the wheel 1 turned toward the outside of the curve, and more particularly approximately perpendicularly to the wheel center plane 15' which causes the negative camber change as already described above. The travelling ideal pivot point 16 of the ideal pivot axis 12 will be displaced toward the rear when turning the wheel toward the outside of the curve, which leads to the positive caster distance increase as also already described hereinabove, which is still further increased by the spring movement.

Since the wheel center plane 15" of the wheel 1 on the inside of the curve extends at least approximately parallelly to the symmetry line 13 of the guide members 6 and 7, also deflected within slight limits, practically no camber change results therefrom alone from the spring movement for the wheel on the inside of the curve which, however, takes place in fact by the spring movement of the lower cross guide member whose axis of rotation extends approximately parallelly to the vehicle longitudinal axis, and more particularly rather to positive values which is desirable for the wheel on the inside of the curve.

With the wheel suspension according to the present invention, the interference force lever arms which are measured in longitudinal elevation of the suspension by the distance of the ideal pivot axis 12 from the wheel center plane 15 at the height of the wheel axis 14, can be kept very small. Furthermore, the lateral guidance of the front wheels can be increased by the already described kinematics when driving through a curve and the tire outer shoulder wear of the front wheels can be reduced. Therebeyond, the deflecting angles of the outer joints of the drive shaft 17, only indicated schematically, are smaller during spring movements and therewith also the drive influences in the steering system.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An independent wheel suspension for a steered wheel of a motor vehicle, comprising wheel carrier means, means for guiding the wheel during spring and steering movements including transverse guide means operatively connecting the lower area of the wheel carrier means with a vehicle superstructure and two individual guide members operatively connecting the upper area of the wheel carrier means with the vehicle superstructure, the wheel being pivotal about an ideal instantaneous pivot axis which results from line of intersection of the two planes that are defined respectively by the lower pivot paint at the wheel carrier means and the two axes of the upper guide members, characterized in that—as viewed in plan view—the symmetry line with respect to the upper two guide members subtends in the straight driving position of the wheel an acute angle to the wheel axis and is located to the rear of the wheel axis as viewed in the driving direction.

2. A wheel suspension according to claim 1, characterized in that both upper guide members are located to the rear of the wheel axis.

3. A wheel suspension according to claim 1 or 2, characterized in that the symmetry line with respect to the two upper guide members corresponding to the straight driving position of the wheel is approximately perpendicular to the wheel center plane of the wheel deflected maximum toward the outside of the curve—as viewed in plan view—and extends approximately parallel to the wheel center plane of the wheel when deflected maximum toward the inside of the curve.

* * * * *